(12) United States Patent
Bogner

(10) Patent No.: US 8,468,235 B2
(45) Date of Patent: *Jun. 18, 2013

(54) SYSTEM FOR EXTRANET SECURITY

(75) Inventor: Etay Bogner, Tel Aviv (IL)

(73) Assignee: Intel Corporation, Santa Clara, CA (US)

(*) Notice: Subject to any disclaimer, the term of this patent is extended or adjusted under 35 U.S.C. 154(b) by 647 days.

This patent is subject to a terminal disclaimer.

(21) Appl. No.: 11/835,995

(22) Filed: Aug. 8, 2007

(65) Prior Publication Data

US 2008/0040478 A1 Feb. 14, 2008

Related U.S. Application Data

(60) Provisional application No. 60/836,733, filed on Aug. 9, 2006.

(51) Int. Cl.
- G06F 15/173 (2006.01)
- G06F 15/16 (2006.01)
- G06F 7/04 (2006.01)
- G06F 17/30 (2006.01)
- H04N 7/16 (2011.01)

(52) U.S. Cl.
USPC ............................. 709/224; 709/229; 726/27

(58) Field of Classification Search
None
See application file for complete search history.

(56) References Cited

U.S. PATENT DOCUMENTS

| | | | |
|---|---|---|---|
| 6,167,448 A | 12/2000 | Hemphill et al. | |
| 6,859,878 B1 | 2/2005 | Kerr et al. | |
| 6,931,446 B1 | 8/2005 | Cox et al. | |
| 7,036,006 B2 | 4/2006 | Bandhole et al. | |
| 7,047,377 B2 | 5/2006 | Elder et al. | |
| 7,107,463 B2 * | 9/2006 | England et al. | 713/193 |
| 7,210,169 B2 | 4/2007 | Smith et al. | |
| 7,269,632 B2 | 9/2007 | Edeker et al. | |
| 7,284,054 B2 | 10/2007 | Radhakrishnan | |
| 7,302,698 B1 | 11/2007 | Proudler et al. | |
| 7,330,981 B2 * | 2/2008 | Willman | 713/193 |
| 7,516,457 B2 | 4/2009 | Eilam et al. | |
| 7,558,864 B2 | 7/2009 | Kalantar et al. | |

(Continued)

FOREIGN PATENT DOCUMENTS

| WO | 2008018055 A2 | 2/2008 |
|---|---|---|
| WO | WO-2008018055 | 2/2008 |
| WO | 2008114257 A2 | 9/2008 |
| WO | WO-2008114257 | 9/2008 |

OTHER PUBLICATIONS

U.S. Appl. No. 60/836,733, filed Aug. 9, 2006.
U.S. Appl. No. 61/019,360, filed Jan. 7, 2008.

(Continued)

*Primary Examiner* — Azizul Choudhury
(74) *Attorney, Agent, or Firm* — Blakely, Sokoloff, Taylor & Zafman LLP

(57) ABSTRACT

A system for communication with a server includes a user computer, which is configured to run first and second operating environments. The first operating environment is arranged to perform general-purpose operations. The second operating environment is configured expressly for interacting with the server in a communication session and is isolated from the first operating environment such that the general-purpose operations performed in the first operating environment do not affect operation of the second operating environment. The system further includes a central management subsystem, which is external to the server and to the user computer and is coupled to monitor the operation of the second operating environment running on the user computer and to control the communication session based on the monitored operation.

31 Claims, 4 Drawing Sheets

U.S. PATENT DOCUMENTS

| | | | |
|---|---|---|---|
| 7,593,413 B2* | 9/2009 | Raisch | 370/401 |
| 7,647,589 B1 | 1/2010 | Dobrovolskiy et al. | |
| 7,698,660 B2 | 4/2010 | Sanchez et al. | |
| 7,756,981 B2 | 7/2010 | Shastri et al. | |
| 8,150,941 B2 | 4/2012 | Edecker et al. | |
| 2002/0029276 A1 | 3/2002 | Bendinelli et al. | |
| 2002/0119427 A1 | 8/2002 | Brown et al. | |
| 2002/0188678 A1 | 12/2002 | Edecker et al. | |
| 2002/0194482 A1 | 12/2002 | Griffin et al. | |
| 2002/0194496 A1* | 12/2002 | Griffin et al. | 713/200 |
| 2003/0018913 A1* | 1/2003 | Brezak et al. | 713/201 |
| 2003/0084348 A1 | 5/2003 | Miyao et al. | |
| 2003/0167410 A1 | 9/2003 | Ringstad et al. | |
| 2003/0172109 A1* | 9/2003 | Dalton et al. | 709/203 |
| 2003/0188193 A1 | 10/2003 | Venkataramappa | |
| 2003/0202522 A1 | 10/2003 | Jiang | |
| 2004/0054901 A1 | 3/2004 | England et al. | |
| 2004/0088536 A1* | 5/2004 | Lim et al. | 713/151 |
| 2004/0139141 A1 | 7/2004 | Lessard | |
| 2004/0172574 A1 | 9/2004 | Wing et al. | |
| 2005/0033980 A1 | 2/2005 | Willman et al. | |
| 2005/0114683 A1 | 5/2005 | Jin et al. | |
| 2005/0125537 A1 | 6/2005 | Martins et al. | |
| 2005/0132031 A1 | 6/2005 | Sailer et al. | |
| 2005/0132229 A1* | 6/2005 | Zhang et al. | 713/201 |
| 2005/0144447 A1* | 6/2005 | England et al. | 713/168 |
| 2005/0183143 A1 | 8/2005 | Anderholm et al. | |
| 2005/0221766 A1 | 10/2005 | Brizek et al. | |
| 2005/0223221 A1* | 10/2005 | Proudler et al. | 713/164 |
| 2006/0017953 A1* | 1/2006 | Ly et al. | 358/1.13 |
| 2006/0053215 A1 | 3/2006 | Sharma | |
| 2006/0130771 A1 | 6/2006 | Yamamoto | |
| 2006/0136910 A1 | 6/2006 | Brickell et al. | |
| 2006/0230438 A1 | 10/2006 | Shappir et al. | |
| 2007/0044143 A1 | 2/2007 | Zhu et al. | |
| 2007/0050484 A1 | 3/2007 | Oertig et al. | |
| 2007/0061887 A1 | 3/2007 | Hoover et al. | |
| 2007/0089111 A1 | 4/2007 | Robinson et al. | |
| 2007/0094503 A1 | 4/2007 | Ramakrishna | |
| 2007/0101400 A1 | 5/2007 | Freeman et al. | |
| 2007/0112774 A1 | 5/2007 | Cheshire | |
| 2007/0129987 A1 | 6/2007 | Hauser et al. | |
| 2007/0143629 A1 | 6/2007 | Hardjono et al. | |
| 2007/0168375 A1 | 7/2007 | Yu | |
| 2007/0192836 A1* | 8/2007 | Shiran et al. | 726/4 |
| 2007/0260866 A1 | 11/2007 | Wang et al. | |
| 2007/0261125 A1 | 11/2007 | Ginter et al. | |
| 2007/0271618 A1 | 11/2007 | Chao et al. | |
| 2007/0300220 A1 | 12/2007 | Seliger et al. | |
| 2008/0040470 A1 | 2/2008 | Bogner | |
| 2008/0040478 A1 | 2/2008 | Bogner | |
| 2008/0046738 A1 | 2/2008 | Galloway et al. | |
| 2008/0059804 A1 | 3/2008 | Shah et al. | |
| 2008/0101223 A1 | 5/2008 | De Los Reyes | |
| 2008/0114844 A1 | 5/2008 | Sanchez et al. | |
| 2008/0209544 A1 | 8/2008 | Kempka | |
| 2008/0222280 A1 | 9/2008 | Lippincott et al. | |
| 2008/0235779 A1 | 9/2008 | Bogner | |
| 2008/0235794 A1 | 9/2008 | Bogner | |
| 2009/0043971 A1 | 2/2009 | Kim | |
| 2009/0049297 A1 | 2/2009 | Omernick et al. | |
| 2009/0049510 A1 | 2/2009 | Zhang et al. | |
| 2009/0100272 A1 | 4/2009 | Smeets | |
| 2009/0164377 A1 | 6/2009 | Aissi | |
| 2009/0276783 A1 | 11/2009 | Johnson et al. | |
| 2010/0154037 A1 | 6/2010 | Sabin et al. | |
| 2010/0218236 A1 | 8/2010 | Hardjono et al. | |

OTHER PUBLICATIONS

Final Office Action from U.S. Appl. No. 12/477,167 mailed Dec. 23, 2011, 27 pages.
Office Action from U.S. Appl. No. 12/348,357 mailed Nov. 28, 2011, 22 pages.
Office Action from U.S. Appl. No. 12/052,246 mailed Feb. 7, 2012, 20 pages.
Final Office Action from U.S. Appl. No. 12/477,167 mailed May 25, 2012, 15 pages.
Notice of Allowance from U.S. Appl. No. 12/052,246 mailed Jun. 21, 2012, 23 pages.
European Search Report from European Application No. 09757979.1 mailed Jul. 5, 2012, 3 pages.
Office Action from European Application No. 09757979.1 mailed Jan. 12, 2011, 2 pages.
International Preliminary Report on Patentability from PCT/IL2009/000019 mailed Jul. 22, 2010, 7 pages.
Office Action from European Application No. 09757979.1 mailed Aug. 10, 2012, 5 pages.
Trusted Computing Group (TCG), "TPM Main Part 1 Design Principles", Specification Version 1.2 Level 2 Revision 103, Jul. 9, 2007.
International Application PCT/IL2007/000954 Preliminary Report on Patentability dated Apr. 23, 2009.
International Application PCT/IL2007/000954 Search Report dated Aug. 5, 2008.
Weiss et al., U.S. Appl. No. 12/348,357 "Stateless attestation system" filed on Jan. 5, 2009.
International Application PCT/IL2009/000019 Search Report dated May 18, 2009.
Bogner, E., U.S. Appl. No. 12/477,167 "Secure multi-purpose computing client" filed Jun. 3, 2009.
U.S. Appl. No. 11/836,028 Official Action dated Jun. 9, 2010.
Office Action from U.S. Appl. No. 12/052,246 mailed Feb. 17, 2011, 30 pages.
Office Action from U.S. Appl. No. 12/052,336 mailed Mar. 10, 2011, 18 pages.
Office Action from U.S. Appl. No. 11/836,028 mailed Dec. 30, 2009.
Final Office Action from U.S. Appl. No. 11/836,028 mailed Jun. 9, 2010.
Office Action from U.S. Appl. No. 11/836,028 mailed Dec. 21, 2010.
Final Office Action from U.S. Appl. No. 11/836,028 mailed Jun. 7, 2011, 18 pages.
Final Office Action from U.S. Appl. No. 12/052,246 mailed Aug. 2, 2011, 18 pages.
Final Office Action from U.S. Appl. No. 12/052,336 mailed Oct. 20, 2011, 17 pages.
International Application PCT/IB2009/052347 Search Report dated Oct. 20, 2009.
International Application PCT/IL2008/00382 Search Report dated Jan. 5, 2009.

* cited by examiner

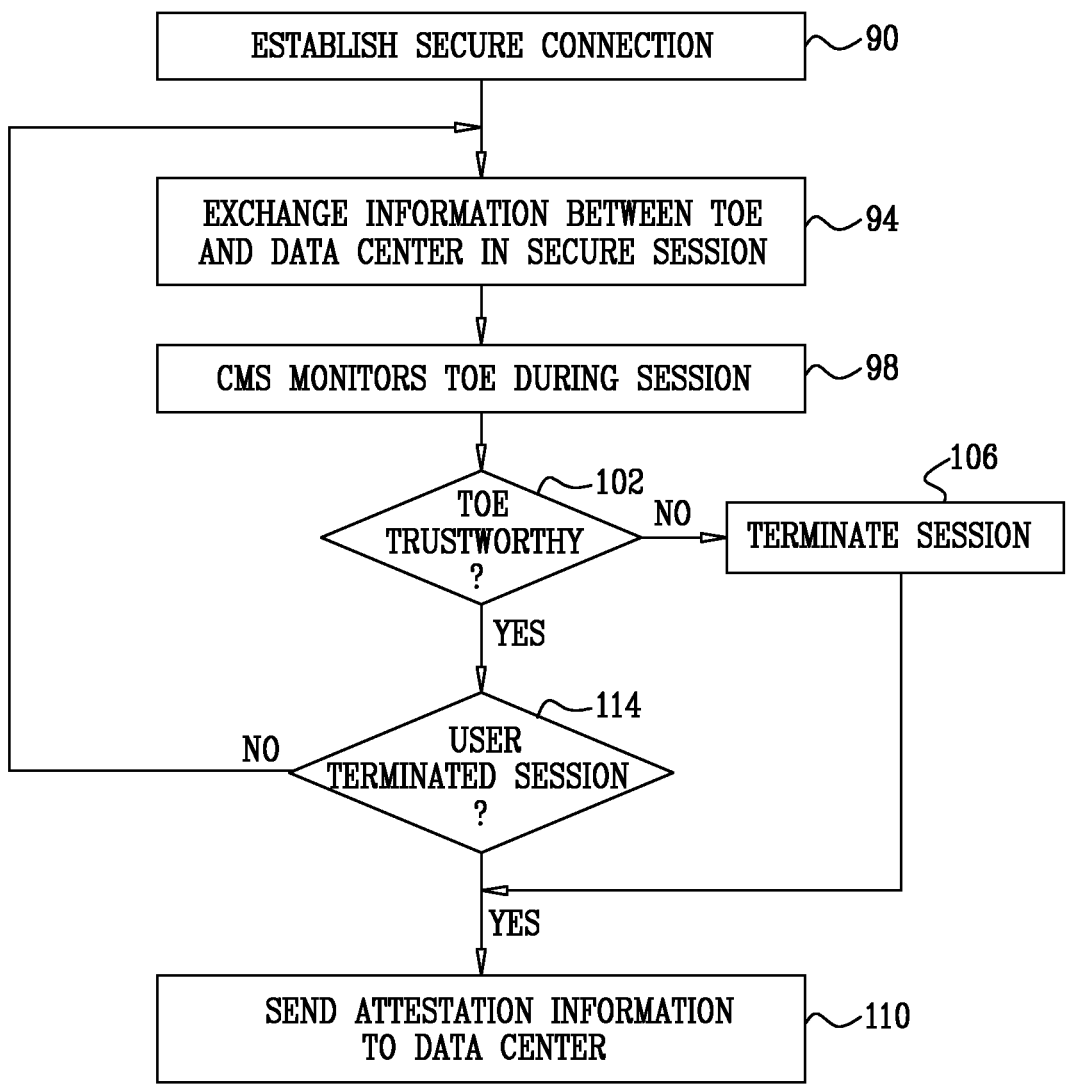

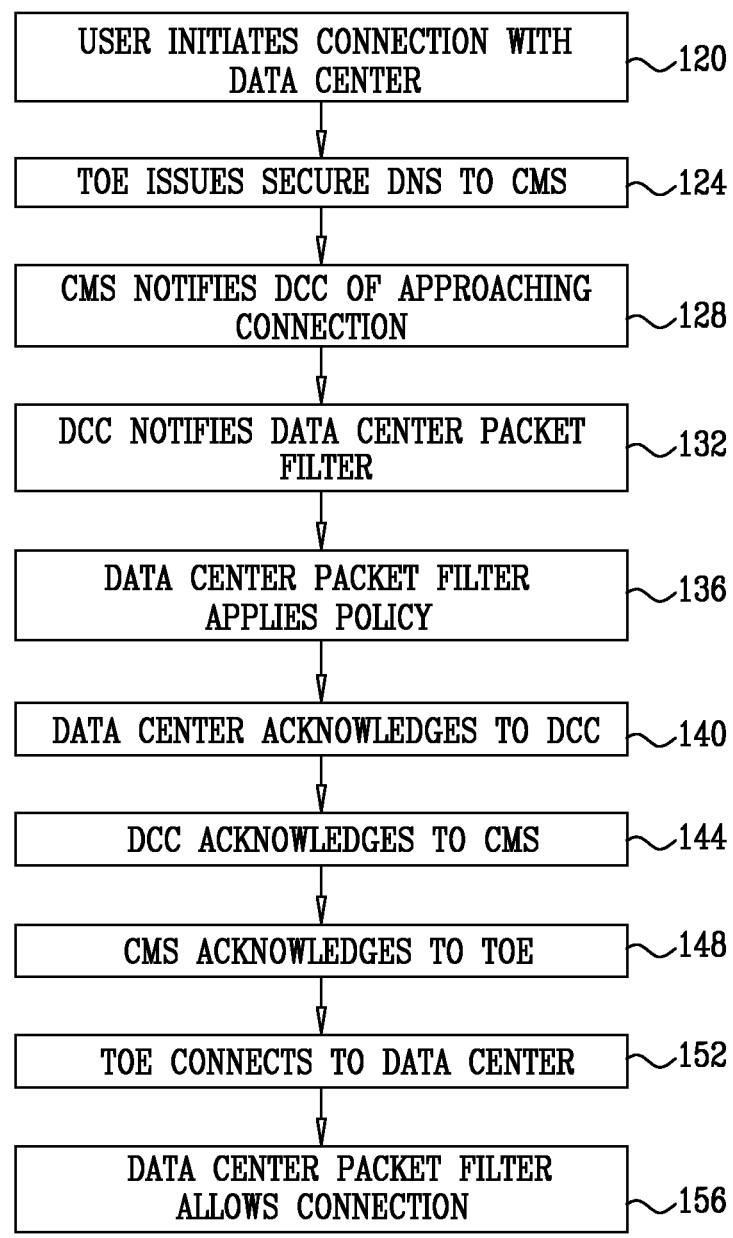

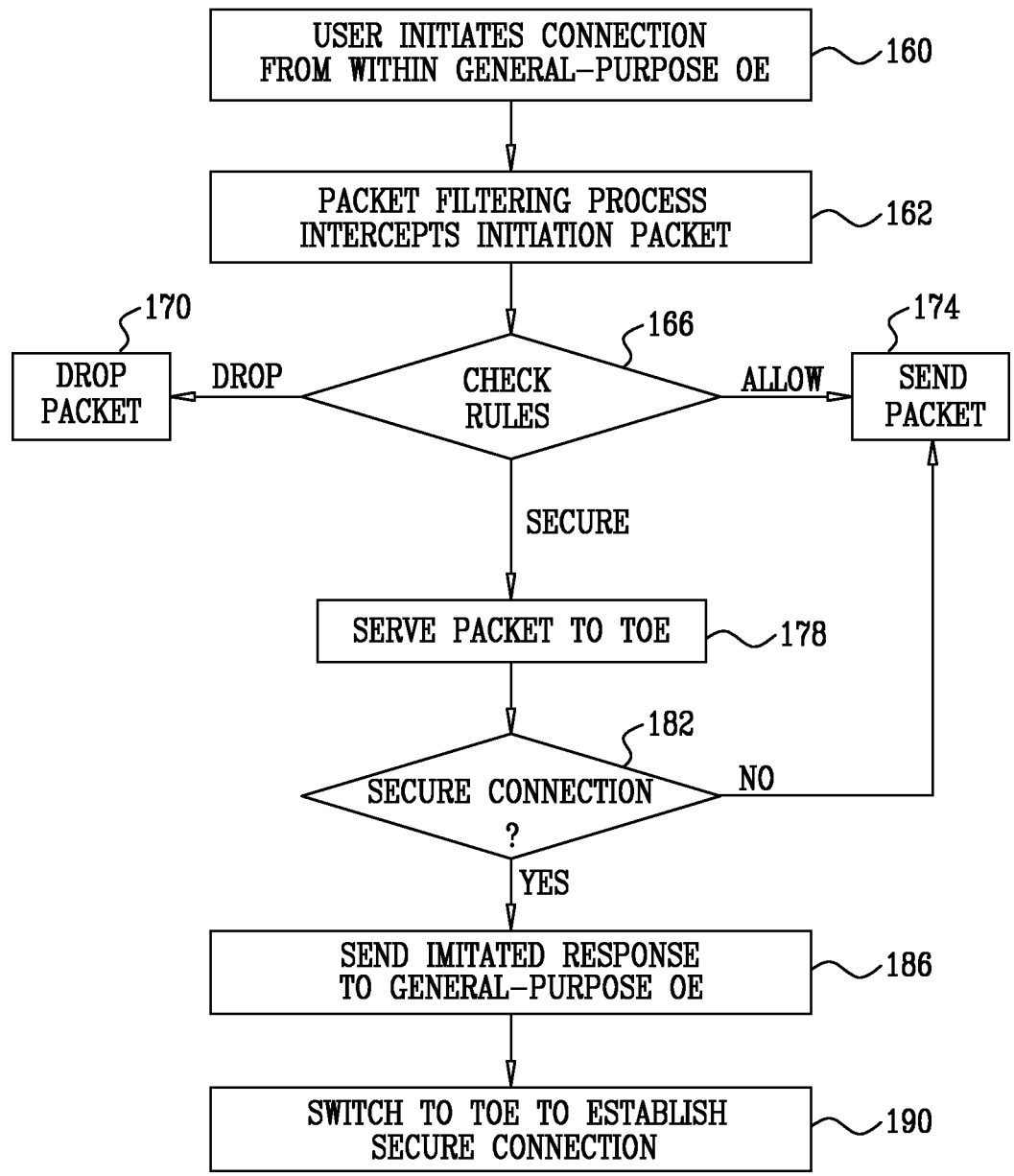

SYSTEM FOR EXTRANET SECURITY

CROSS-REFERENCE TO RELATED APPLICATIONS

This application claims the benefit of U.S. Provisional Patent Application 60/836,733, filed Aug. 9, 2006, and is related to another U.S. patent application, entitled "Method for Extranet Security," filed on even date, whose disclosures are incorporated herein by reference.

FIELD OF THE INVENTION

The present invention relates generally to computer networks, and particularly to methods and systems for secure communication over data communication networks.

BACKGROUND OF THE INVENTION

Various applications allow users to interact with a computer system of an organization over the Internet or other public network. Such applications are often referred to as extranet applications. For example, extranet applications enable users to carry out financial transactions with organizations such as banks or insurance companies and make purchases using electronic commerce (e-commerce) web-sites. Employees can access organization data remotely over the Internet, and physicians can access medical records maintained by health institution database systems.

Communication security is often a prime consideration in the design and deployment of extranet applications, especially since extranet communication traffic traverses a public network and since user computers are often not under the control of the organization. Several methods and systems for increasing the security of extranet communication are known in the art.

For example, U.S. Patent Application Publication 2002/0029276, whose disclosure is incorporated herein by reference, describes methods and systems for enabling a network connection between first and second processors using at least one additional processor separate from the first and second processors. In one embodiment, the first and second processors may each be independently administered through the additional processor. Further, the additional processor may receive information indicating consent on behalf of the first processor to enabling a tunnel between the first processor and the second processor and receives information indicating consent on behalf of the second processor to enabling a tunnel between the second processor and the first processor. The additional processor may determine a first virtual address for the first processor and a second virtual address for the second processor such that the first and second virtual addresses uniquely identify the first and second processors, respectively, and are routable through the network. The additional processor may provide to each of the first and second processors the first and second virtual addresses to enable one or more tunnels between the first and the second processors.

U.S. Pat. No. 7,210,169, whose disclosure is incorporated herein by reference, describes an originator device, which allows for a unique pass-phrase to be communicated to a service system. The originator device has a fixed token, in which a unique platform identifier is recorded, and a processor that generates a representation of the platform configuration. The representation is communicated to a registry service as a unique, platform-specific pass-phrase associated with the originator.

Some security methods and systems attempt to verify the integrity of the operating environment of a server or user computer, i.e., verify that the operating environment has not been corrupted or tampered with. For example, U.S. Patent Application Publication 2005/0221766, whose disclosure is incorporated herein by reference, describes a method and apparatus for performing dynamic attestation for a communication system. Several methods for measuring and reporting the integrity of a system, such as a wireless device, are described.

U.S. Patent Application Publication 2005/0132031, whose disclosure is incorporated herein by reference, describes a system and method for providing attestation and/or integrity of a server execution environment. One or more parts of the server environment are selected for measurement. The selected parts are measured, and the measurements result in a unique fingerprint for each selected part. The unique fingerprints are aggregated by an aggregation function to create an aggregated value, which is determinative of running programs in the server environment. A measurement parameter may include the unique fingerprints, the aggregated value or a base system value and may be sent over a network interface to indicate the server environment status or state.

SUMMARY OF THE INVENTION

Embodiments of the present invention provide a system for communication with a server, the system including:

a user computer, which is configured to run a first operating environment for performing general-purpose operations, and a second operating environment, which is configured expressly for interacting with the server in a communication session and is isolated from the first operating environment such that the general-purpose operations performed in the first operating environment do not affect operation of the second operating environment; and a central management subsystem, which is external to the server and to the user computer and is coupled to monitor the operation of the second operating environment running on the user computer and to control the communication session based on the monitored operation.

In some embodiments, the system includes multiple user computers, which are configured to run respective first and second operating environments so as to interact in respective communication sessions with one or more servers using the second operating environments and to perform general-purpose operations using the first operating environments, the second operating environments are isolated from the respective first operating environments, and the central management subsystem is external to the user computers and to the servers and is coupled to monitor the operation of the second operating environments running on the user computers and to control the respective communication sessions based on the monitored operation.

In an embodiment, the central management subsystem is coupled to assess a trustworthiness of the second operating environment and to report the assessed trustworthiness to the server in order to control the communication session. In another embodiment, the system includes a connector unit, which is connected to the server and is arranged to communicate with the central management subsystem, and the central management subsystem is coupled to report the assessed trustworthiness to the connector unit. In yet another embodiment, the central management subsystem is coupled to compute a trust rank quantifying the trustworthiness of the second operating environment and to send the trust rank to the connector unit, and the connector unit is arranged to apply a policy applicable to the communication session responsively to the trust rank. In still another embodiment, the central management subsystem is coupled to compute a trust rank quantifying the trustworthiness of the second operating environment and to apply a policy applicable to the communication session responsively to the trust rank. The central management subsystem may be coupled to receive the policy from the server via the connector unit.

In a disclosed embodiment, the central management subsystem is coupled to report the assessed trustworthiness to the server by sending the assessed trustworthiness to the user computer, and the user computer is coupled to send the assessed trustworthiness to the server. Additionally or alternatively, the central management subsystem is coupled to assess the trustworthiness by detecting variations in the operation of the second operating environment.

In an embodiment, the central management subsystem is coupled to provide Trusted Network Information (TNI) to the user computer for conducting the communication session, and the user computer is coupled to receive the TNI from the central management subsystem and to conduct the communication session using the received TNI. The TNI may include at least one information type selected from a group of types consisting of an Internet Protocol (IP) address, routing information, domain resolution information and a security certificate.

In another embodiment, the user computer is coupled to notify the central management subsystem before initiation of the communication session with the server, and the central management subsystem is coupled to notify the server of the session initiation and of communication attributes to be used by the user computer in the session initiation, so as to cause the server to allow the session initiation based on the notified communication attributes. In yet another embodiment, the system includes a connector unit, which is connected to the server and is arranged to communicate with the central management subsystem so as to be receive the communication attributes of the session initiation, and a packet filter, which is attached to the server and is arranged to accept the communication attributes from the connector unit and to allow the session initiation having the communication attributes. The communication attributes may include at least one attribute selected from a group of attributes consisting of an IP address, a port number and a security certificate to be used by the user computer in the session initiation.

In still another embodiment, the user computer includes a virtualization unit, which is arranged to allocate resources of the user computer to the first and second operating environments.

In some embodiments, the user computer is coupled to enforce a policy of the server using the second operating environment. In an embodiment, in accordance with the policy, the user computer may be coupled to selectively process information provided by the server from within the second operating environment. The information provided by the server may include documents. Additionally or alternatively, in accordance with the policy, the user computer may be coupled to log an event related to the second operating environment and to forward the logged event to the server. Further additionally or alternatively, in accordance with the policy, the user computer may be coupled, upon identifying that an action performed by a user of the user computer is predefined as a non-repudiation action, to cause the user to perform re-authentication and to forward a log of the re-authentication to the server.

In a disclosed embodiment, the central management subsystem is coupled to receive a notification from the server upon a change in communication settings of the server, and to update the user computer with the change. Additionally or alternatively, the central management subsystem may be coupled to receive a notification from the user computer upon a change in communication settings of the user computer, and to update the server with the change.

In some embodiments, the user computer is coupled to identify a data packet indicating that a user of the user computer requests to initiate the communication session with the server from within the first operating environment, and to switch to initiating the communication session from within the second operating environment. In an embodiment, the user computer runs a packet filtering process, which is arranged to process the data packet in accordance with a rule, and to forward the data packet to the second operating environment when the rule identifies that the data packet is related to communication with the server. In another embodiment, the user computer is coupled to terminate initiation of the communication session in the first operating environment by sending an imitated reply packet to the first operating environment in response to the data packet.

In a disclosed embodiment, the central management subsystem is coupled to store an image code of the second operating environment, and the user computer is coupled to download the image from the central management subsystem during the communication session. In another embodiment, the central management subsystem includes a configuration interface for configuring the second operating environment of the user computer.

In some embodiments, the central management subsystem is coupled to produce attestation information regarding the second operating environment based on the monitored operation of the second operating environment, and to provide the attestation information to the server. Additionally or alternatively, the central management subsystem is coupled to produce authentication information regarding the user computer based on the monitored operation of the second operating environment, and to provide the authentication information to the server. Further additionally or alternatively, the central management subsystem is coupled to produce authentication information regarding a user of the user computer based on the monitored operation of the second operating environment, and to provide the authentication information to the server. The central management subsystem may be coupled to assess a trustworthiness of information conveyed in the communication session and to report the assessed trustworthiness to the server.

There is additionally provided, in accordance with an embodiment of the present invention, a computing method, including:

running on a user computer a first operating environment for performing general-purpose operations and a second operating environment, which is configured expressly for interacting with a server in a communication session and is isolated from the first operating environment such that the general-purpose operations performed in the first operating environment do not affect operation of the second operating environment;

monitoring the operation of the second operating environment running on the user computer by means of a central management subsystem, which is external to the server and to the user computer; and controlling the communication session based on the monitored operation.

There is further provided, in accordance with an embodiment of the present invention, a user computer, including:

a first operating environment for performing general-purpose operations; and a second operating environment, which is configured expressly for interacting with a server in a communication session and is isolated from the first operating environment such that the general-purpose operations performed in the first operating environment do not affect operation of the second operating environment, the second operating environment further coupled to provide information to a central management subsystem external to the user computer so as to enable the central management subsystem to monitor the operation of the second operating environment and to control the communication session based on the monitored operation.

There is also provided, in accordance with an embodiment of the present invention, a method for communication with a server, including:

running on a user computer a first operating environment for performing general-purpose operations;

running on the user computer a second operating environment, which is configured expressly for interacting with the server in a communication session and is isolated from the first operating environment such that the general-purpose operations performed in the first operating environment do not affect operation of the second operating environment; and providing information by the second operating environment to a central management subsystem external to the user computer so as to enable the central management subsystem to monitor the operation of the second operating environment and to control the communication session based on the monitored operation.

There is additionally provided, in accordance with an embodiment of the present invention, a computer software product for use in a user computer, the product including a computer-readable medium, in which program instructions are stored, which instructions, when executed by the user computer, cause the user computer to run a first operating environment for performing general-purpose operations, to run a second operating environment, which is configured expressly for interacting with a server in a communication session and is isolated from the first operating environment such that the general-purpose operations performed in the first operating environment do not affect operation of the second operating environment, and to provide information by the second operating environment to a central management subsystem external to the user computer so as to enable the central management subsystem to monitor the operation of the second operating environment and to control the communication session based on the monitored operation.

There is also provided, in accordance with an embodiment of the present invention, a central management system, including:

a network interface, which is arranged to communicate over a communication network with a server and with a user computer, which runs a first operating environment for performing general-purpose operations and a second operating environment that is configured expressly for interacting with the server in a communication session and is isolated from the first operating environment such that the general-purpose operations performed in the first operating environment do not affect operation of the second operating environment; and a processor, which is coupled to monitor the operation of the second operating environment running on the user computer and to control the communication session based on the monitored operation.

There is further provided, in accordance with an embodiment of the present invention, a method for communication, including:

communicating over a communication network with a server and with a user computer, which runs a first operating environment for performing general-purpose operations and a second operating environment that is configured expressly for interacting with the server in a communication session and is isolated from the first operating environment such that the general-purpose operations performed in the first operating environment do not affect operation of the second operating environment;

monitoring the operation of the second operating environment running on the user computer; and controlling the communication session based on the monitored operation.

There is additionally provided, in accordance with an embodiment of the present invention, a computer software product for use in a central management subsystem, the product including a computer-readable medium, in which program instructions are stored, which instructions, when executed by the central management subsystem, cause the central management subsystem to communicate over a communication network with a server and with a user computer, which runs a first operating environment for performing general-purpose operations and a second operating environment that is configured expressly for interacting with the server in a communication session and is isolated from the first operating environment such that the general-purpose operations performed in the first operating environment do not affect operation of the second operating environment, to monitor the operation of the second operating environment running on the user computer, and to control the communication session based on the monitored operation.

There is also provided, in accordance with an embodiment of the present invention, apparatus coupled to a server for controlling communication between the server and a user computer, the apparatus including:

a network interface, which is arranged to communicate with a central management subsystem external to the server and to the user computer over a communication network; and a processor, which is arranged to exchange with the central management subsystem information regarding the user computer, and to cause the server to act upon the information so as to control a communication session conducted over the communication network between the server and the user computer.

There is also provided, in accordance with an embodiment of the present invention, a method for controlling communication between a user computer and a server, the method including:

coupling to the server a connector unit that communicates over a communication network with a central management subsystem external to the server and to the user computer; and exchanging between the connector unit and the central management subsystem information regarding the user computer; and causing the server to act upon the information so as to control a communication session conducted over the communication network between the server and the user computer.

There is additionally provided, in accordance with an embodiment of the present invention, a computer software product for use in an apparatus coupled to a server for controlling communication between the server and a user computer, the product including a computer-readable medium, in which program instructions are stored, which instructions, when executed by a processor in the security apparatus, cause the processor to communicate with a central management subsystem external to the server and to the user computer over a communication network, to exchange with the central management subsystem information regarding the user computer, and to cause the server to act upon the information so as to control a communication session conducted over the communication network between the server and the user computer.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for conducting secure communication sessions, in accordance with an embodiment of the present invention;

FIG. 3 is a flow chart that schematically illustrates a method for establishing a secure communication session, in accordance with an embodiment of the present invention; and FIG. 4 is a flow chart that schematically illustrates a method for selectively switching to a trusted operating environment in a user computer, in accordance with an embodiment of the present invention.

DETAILED DESCRIPTION OF EMBODIMENTS

Overview

Figure 1:
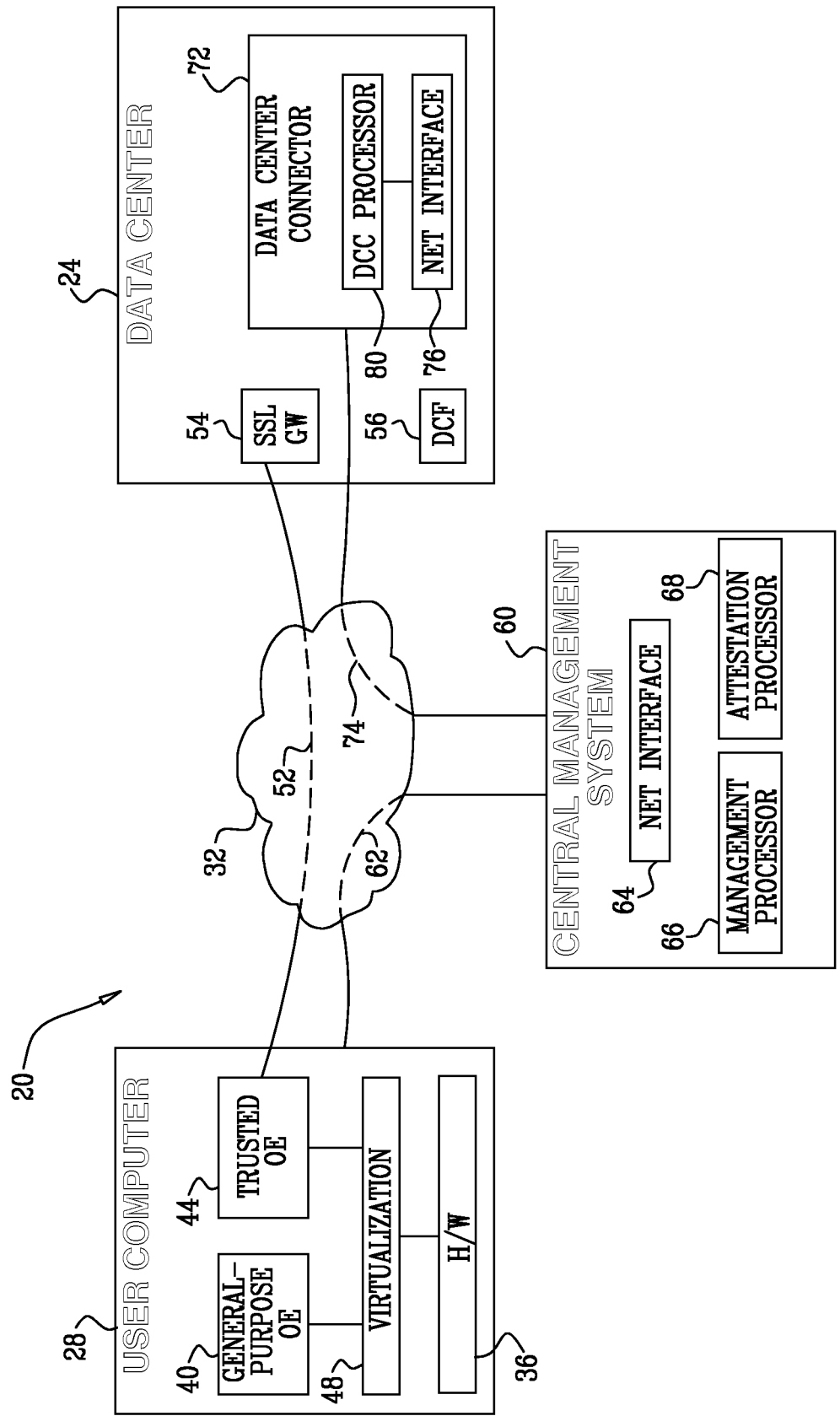
FIG. 1 is a block diagram that schematically illustrates a system for secure extranet communication, in accordance with an embodiment of the present invention.

One of the prime challenges faced by extranet applications is to secure the operating environment of the user computer, i.e., the computer operating system and the different applications and processes it runs. Illegitimate modification or corruption of the user computer operating environment may expose the extranet application to viruses and other malicious attacks, as well as cause leakage of sensitive information.

In many practical scenarios, however, the user computer as a whole cannot be regarded as a trusted computer, since it is usually not under the control of the extranet application or of the organization that operates the application. The user computer may run numerous different processes and applications other than the extranet application in question, and may have a practically infinite number of combinations of hardware and software components that may be active at any given time. Under these conditions, verifying the trustworthiness of the operating environment of the user computer, i.e., ensuring that the operating environment running the extranet application has not been corrupted or tampered with, is all but impossible.

In view of the difficulties described above, embodiments of the present invention provide improved methods and systems for establishing and conducting secure communication sessions between user computers and data centers or other servers. In the embodiments that are described hereinbelow, each user computer runs two operating environments that are decoupled, or isolated, from one another. One operating environment, referred to as a Trusted Operating Environment (TOE), is configured expressly for interacting with the data center using the extranet application. The other operating environment, referred to as a General-Purpose Operating Environment (GPOE), runs applications and processes other than the extranet application in question.

The TOE is typically configured with fixed network settings for communicating exclusively with the data center (e.g., a fixed destination IP address belonging to the data center, with which the TOE is able to communicate), and its exclusive task is to interact with the data center. As a result of the fixed configuration and the isolation from other operating environments, reliable detection of deviations from the normal TOE behavior, configuration or performance is feasible.

The system further comprises a Central Management System (CMS) that is external to the user computers and to the data center. The CMS monitors the TOEs running on the user computers in order to verify their trustworthiness. Typically, the CMS monitors the configuration, performance and/or behavior of the TOE, and verifies that the TOE has not been modified or corrupted, such as by a virus or other malicious software.

The CMS reports the monitoring results to the data center, which in turn determines whether or not the TOE can be trusted. The data center comprises a Data Center Connector (DCC), which serves as an interface between the data center and the CMS. The DCC also maintains policies that determine the trustworthiness of TOEs as a function of the CMS monitoring results. In addition, The CMS provides TOEs with Trusted Network Information (TNI), so that the TOEs are able to communicate with the data center via secure connections without relying on non-trusted network information. In a typical implementation, a single CMS is connected to multiple data centers, and is able to provide each TOE with TNI that matches its respective data center.

Thus, the CMS essentially controls the communication sessions conducted by the user computers with the data center, based on the monitored operation of the respective TOEs.

Several exemplary system configurations and associated methods are described below, such as methods for establishing secure connections between the user computers and the data center using the CMS and DCC, and for automatically switching the operation of the user computer from the GPOE to the TOE when a secure connection is requested.

The CMS monitoring results can be used for external attestation as to the trustworthiness of the TOEs, the communication sessions the TOEs conduct and the information conveyed in such sessions, for authentication of users and user computers, and/or for performing other Authentication, Authorization, and Accounting (AAA) functions.

Some known methods for securing the user computer use security measures that operate from within the general-purpose operating system of the computer. Unlike these known methods, user computers that use the methods and systems described herein interact with the data center from within a dedicated, isolated operating environment, whose trustworthiness is continually assessed by a trusted external entity (the CMS). This technique considerably enhances the immunity of the user computer operating environment against various security threats.

The enhanced security provided by the disclosed methods and systems enables organizations to deploy extranet applications with improved cost-effectiveness and user satisfaction. As will be shown below, the system configurations described herein are inherently scalable to support mass deployment of large numbers of data centers and user computers.

System Description

FIG. 1 is a block diagram that schematically illustrates a system 20 for secure extranet communication, in accordance with an embodiment of the present invention. In system 20, a user computer 28 interacts with a server, such as a data center 24. Data center 24 may comprise, for example, an e-commerce web-site, a computer system of a financial institution or other organization, a database server and/or any other suitable computing platform that interacts with users or clients. The data center may comprise one or more computing platforms. Users may comprise, for example, customers, suppliers, employees or partners of the organization. Although FIG. 1 shows only a single user for the sake of clarity, a typical system comprises multiple users connected to the data center at any given time.

User computer 28 and data center 24 communicate over a communication network 32. Network 32 may comprise a Wide Area Network (WAN), such as the Internet, a Metropolitan Area Network (MAN), a Local Area Network (LAN), a wired or wireless data network, or any other suitable network or combination of network types. Typically, at least part of network 32 is public.

User computer 28 may comprise a personal computer, a mobile computing/communication device or any other suitable user terminal. In the context of the present patent application and in the claims, the term "user computer" is used broadly and refers to any type of computing platform that is capable of communicating over a network.

Computer 28 comprises hardware 36, typically comprising one or more Central Processing Unit (CPU) devices, memory devices and any other suitable components or subsystems normally found in computing platforms. The computer runs two operating environments in parallel. A Trusted Operating Environment (TOE) 44 is configured expressly for communicating with data center 24. A General-Purpose Operating Environment (GPOE) 40 runs the different applications of the computer other than the extranet application. For example, in some embodiments the GPOE comprises a Microsoft® Windows® operating system, and the TOE comprises a Linux® operating system that runs a Firefox® browser. Alternatively, any other suitable operating system, such as Apple® Mac OS®, can also be used.

GPOE 40 and TOE 44 are decoupled, or isolated, from one another. In other words, the behavior, configuration and performance of one operating environment have little or no effect on the behavior, configuration and performance of the other. In particular, the performance and behavior of the TOE is insensitive to the operation of the GPOE. Computer 28 comprises a virtualization layer 48, which allocates hardware resources and other resources of computer 28 to the GPOE and TOE. Any suitable virtualization means, which may be implemented in hardware and/or software, can be used for this purpose. In some embodiments, the GPOE and TOE run on separate "virtual CPUs" managed by the virtualization layer. Transition from one operating environment to another is usually transparent to the user.

User computer 28 and data center 24 communicate over a secure connection 52, such as a connection that uses the well-known Secure Sockets Layer (SSL) protocol. The data center typically comprises an SSL Gateway (SSL GW) 54, which terminates the SSL connection at the data center end, and is able to allow or deny connection to the data center. Typically but not necessarily, the users connect to the data center by connecting to a web server of the data center and accessing a web portal using a web browser. The SSL GW and web server may comprise separate computing platforms or be integrated in a single platform. In some embodiments, data center 24 comprises a Data Center packet Filter (DCF) 56, which filters packets arriving at the data center. The operation of the packet filter is described in detail further below.

System 20 further comprises a Central Management System (CMS) 60, which monitors, configures and controls TOE 44 of computer 28. CMS 60 comprises a network interface 64, which is connected to network 32. The CMS comprises a management processor 66, which carries out the monitoring, control and configuration functions described herein and an attestation processor 68, which carries out attestation tests on the TOEs. Processors 66 and 68 may be located in proximity to one another or at different locations. In some embodiments, the functions of processors 66 and 68 are implemented in a single computing platform. The functions of attestation processor 68 may be distributed among multiple, distributed attestation servers. Thus, processors 66 and 68 may be collectively viewed as a single processor, whose functions may be carried out by one or more physical computers in one or more locations.

The CMS communicates with the TOE over network 32 using a secure connection 62, such as an SSL connection. The CMS monitors the TOE and attempts to detect situations in which the TOE has been corrupted or modified. The CMS reports the monitoring results to the data center. Since the exclusive task of the TOE is communicating with the data center, and since it typically has a fixed configuration, reliable detection of deviations from normal behavior, configuration and/or performance is feasible.

In some embodiments, the configuration of the TOE may not be entirely fixed, and the TOE may perform certain minor tasks other than communication with the data center. Thus, the terms "fixed configuration" and "configured expressly for interacting with the data center" are meant to describe a situation in which the effect of any additional tasks carried out by the TOE is sufficiently minor, such that the TOE configuration is sufficiently fixed to allow reliable detection of anomalous behavior or performance.

Data center 24 comprises a Data Center Connector (DCC) 72, which serves as an interface between the CMS and the data center. The DCC communicates with the CMS over network 32 using a secure connection 74, such as an SSL connection. In addition to serving as an interface, the DCC sometimes maintains policies that define how different TOEs are treated by the data center as a function of their trustworthiness, as monitored and reported by the CMS.

DCC 72 comprises a network interface 76 for communicating over network 32, and a DCC processor 80 that carries out the different DCC functions. In some embodiments, DCC 72 comprises a hardware/software unit that is separate from data center 24. Alternatively, the functions of the DCC can be embodied in one or more processors of the data center. In some embodiments, the DCC may interact with internal identity management functions of the data center and/or with internal fraud detection systems. The DCC may participate in provisioning of certificates and may enable minor changes in the web portal accessed by the users.

Typically, hardware 36 of user computer 28, processors 66 and 68 of CMS 60 and DCC processor 80 of DCC 72 comprise general-purpose processors, which are programmed in software to carry out the functions described herein. The software may be downloaded to the processors in electronic form, over a network, for example, or it may alternatively be supplied to the processors on tangible, computer-readable media, such as CD-ROM. In particular, the TOE configuration may be distributed to the user computer as software code on suitable tangible media. For example, the user may be provided with tangible storage media storing a self-extracting file, which comprises a pre-configured Linux operating system and a Firefox browser that is pre-configured for exclusive communication with the data center.

Although FIG. 1 shows a single data center and a single user computer running a single TOE, this configuration was chosen purely for the sake of conceptual clarity. In alternative embodiments, a particular CMS may control multiple user computers. Additionally or alternatively, a particular CMS can operate with multiple data centers or other servers. Further additionally or alternatively, a certain user computer may run two or more TOEs, which are decoupled from one another and from the GPOE, for securely connecting to multiple separate data centers. In some cases each data center belongs to a different organization. In other cases, a certain organization may operate multiple data centers.

Secure Communication Methods

FIG. 2 is a flow chart that schematically illustrates a method for conducting ongoing secure communication sessions between computer 28 and data center 24, in accordance with an embodiment of the present invention. The method begins with user computer 28 establishing secure connection 52 with data center 24, at a connection establishment step 90. In some embodiments, the connection establishment is coordinated and approved, or otherwise controlled, by the CMS. An exemplary method for establishing connection 52 in a secure manner via the CMS is described in FIG. 3 below. In some embodiments, the user computer automatically identifies that the user intends to initiate a secure connection, and causes the connection establishment to be carried out from within the TOE. An exemplary method for automatic switching to the TOE is described in FIG. 4 below.

Computer 28 and data center 24 exchange data by conducting a communication session using connection 52, at a session interaction step 94. During the session, CMS 60 (typically attestation processor 68) continuously monitors the behavior, performance and/or configuration of TOE 44, at a monitoring step 98. The CMS may monitor the TOE at regular intervals or using any other suitable monitoring scheme. Any suitable TOE parameters can be monitored.

For example, the CMS may monitor whether certain code fragments are executed as expected by the TOE, whether certain memory pages or addresses contain the data they are expected to contain, whether certain performance counters are within expected values (assuming that any undesired code running in the TOE will consume some CPU resources), whether bandwidth utilization of the session is within expected limits, whether the software running in the TOE has an expected version number (and indicate that upgrade is desired in case of a mismatch), and/or any other suitable TOE parameter.

Based on the monitored TOE parameters, the CMS verifies the integrity of the TOE, i.e., checks whether the TOE is trustworthy or whether it is suspected of being corrupted or modified, at a trustworthiness checking step 102. The assessed trustworthiness is subsequently used for controlling the communication sessions between the TOE and the data center, as will be shown below.

The decision as to whether the TOE is trustworthy can be carried out by the CMS, by the DCC, or both. For examples in some embodiments the CMS computes a "trust rank" of the TOE based on the monitored parameters. Typically, a higher trust rank corresponds to a higher likelihood that the TOE is trustworthy, although an opposite convention can also be used. In these embodiments, the CMS reports the trust rank to the DCC without making a decision. The DCC maintains a policy that defines how the TOE is to be treated based on its trust rank. Configurations in which policies are stored and maintained by the DCC may be especially preferable in systems in which the CMS is connected to multiple data centers. Storing and maintaining trust policies in the DCC enables each organization or data center to control its individual rules and policies, and makes the overall system flexible and scalable.

In alternative embodiments, the trust policies of the organization are stored and maintained by the CMS. In these embodiments, the CMS decides whether a particular TOE is trustworthy or not, such as by computing trust ranks and applying the appropriate policy. The DCC serves as a logical proxy, via which the data center provides trust policies to the CMS. Trustworthiness decisions may also be taken by both the CMS and the DCC. For example, the CMS may refuse a connection when the trust rank is below a certain threshold. If the trust rank exceeds the threshold, the CMS leaves the decision to the DCC.

In some embodiments, the TOE may also authenticate the data center. For example, if a certain configuration parameter does not match its expected value (e.g., a wrong security certificate), the TOE may refrain from connecting to the data center.

If the CMS and/or DCC conclude that the TOE is not trustworthy, the DCC instructs the data center to terminate the session, at a termination step 106. Session termination can be enforced, for example, by SSL GW 54.

In some embodiments, the CMS sends attestation information regarding the session to the data center, at an attestation step 110. The attestation information may comprise any information regarding the session that is externally-verified by the CMS, such as the current trust rank value, the time and date of the session, the data exchanged, etc. The attestation information is received by the DCC and is typically forwarded to the data center.

The CMS may produce attestation information at any time, from the moment the user initiates the session, throughout the session progress, and until after the session is terminated. Some or all of the information may be logged and/or archived at the data center.

If, on the other hand, the CMS and/or DCC conclude that the TOE is trustworthy at step 102 above, the DCC enables the session to continue. The CMS checks whether the user has terminated the session, at a user termination checking step 114. If the session has ended normally, the CMS sends attestation information to the data center at step 110 above, and the method terminates. Otherwise, the method loops back to session interaction step 94 above, and the user computer and the data center continue to conduct the session. The attestation process continues, as well.

Alternatively to sending the trust rank from the CMS to the DCC, in some embodiments the CMS may provide the trust rank to the TOE of the user computer. The trust rank is typically signed by the CMS with a suitable certificate or other security measure, in order to ensure its trustworthiness even when the TOE itself may not be trustworthy. The signed trust rank is provided by the TOE to the data center over connection 52, and the data center applies the appropriate policy based on the received trust rank.

FIG. 3 is a flow chart that schematically illustrates a method for establishing a secure communication session between computer 28 and data center 24, in accordance with an embodiment of the present invention. The method of FIG. 3 can be used to carry out connection establishment step 90 of the method of FIG. 2 above. Initially, packet filter 56 in data center 24 blocks all traffic to the data center, so that only connection initiations that are pre-coordinated via the CMS and DCC are allowed.

The method begins with the user initiating a connection with the data center, at an initiation step 120. In the present example, the TOE of the user computer notifies the CMS that it intends to initiate a connection with the data center by issuing a secure Domain Name System (DNS) request to the CMS, at a DNS requesting step 124. (An alternative scenario, in which the connection is initiated without domain name resolution, is addressed in FIG. 4 below.)

The DNS request packet sent to the CMS is typically signed, such as using a suitable certificate. The TOE informs the CMS of its current Internet Protocol (IP) address. If the user computer belongs to a network that uses Network Address Translation (NAT), the TOE informs the CMS of the external IP address. The TOE obtains from the CMS an IP address that corresponds to the requested domain name and possibly other routing information, which can be regarded by the TOE as Trusted Network Information (TNI). This process can be used by the CMS to apply client-side load balancing, client-side high-availability, and/or other desired policies. In some embodiments, the TOE presents a message to the user indicating the secure connection establishment.

The CMS notifies the DCC of the expected connection initiation, at a connection notification step 128. The CMS informs the DCC that a specific user computer having a specific IP address (provided to the TOE at step 124 above) is expected to connect to the data center. The CMS may also inform the DCC of the source port address to be used by the user computer, if this address is not fixed, and of the certificate this computer is expected to use. The DCC notifies packet filter 56 of the expected connection initiation, and provides the connection information received from the CMS, at a DCF notification step 132. The DCC also provides the packet filter with the applicable policy. The data center packet filter applies the policy, at a policy enforcing step 136, and optionally caches the connection information.

The data center packet filter sends an acknowledgment to the DCC, acknowledging that the policy has been applied, at a policy acknowledgement step 140. The DCC sends a corresponding acknowledgment to the CMS, at a DCC acknowledgement step 144. The CMS sends a corresponding acknowledgment to the user computer TOE, at a CMS acknowledgement step 148. At this stage, the data center packet filter has applied a policy that will allow the user computer to connect, and the user computer TOE has been notified to this effect.

The TOE proceeds in connecting to the data center, at a connection step 152. The TOE uses the IP address provided by the CMS, which possibly takes into account load balancing, high availability and other policies. Packet filer 56 in data center 24 allows the packets arriving from user computer 28 to pass through, since it was provisioned accordingly at step 136 above.

Policy Enforcement and Configuration Management

In some embodiments, certain policies of the data center are carried out and enforced by the TOE. Some policies may restrict, allow or otherwise selectively control the processing of data center information during the session. For example, the data center may have a printing policy, which permits user computers to print certain documents and forbids printing of other documents. In the present example, printing is prohibited by default, unless a certain document is allowed for printing by the data center. Documents whose printing is permitted are marked accordingly in the web portal of the data center accessed by the user computer. The indication as to whether printing of a certain page is allowed is provided to the TOE, either directly from the portal over connection 52, or indirectly via the DCC and CMS over connections 74 and 62. The indications can be provided either document by document or as a list of documents whose printing is allowed. Indications can be delivered either on-demand in real time, or off-line. The TOE can enable and disable printing of a certain document by selectively showing and hiding the "Print" button of the TOE browser, based on the respective indication of the page. This technique of enforcing policies, which can be applied to other types of policy, is secure because it is embedded in the TOE.

The data center policies may also define that certain events related to the interaction between user computers and the data center are logged and archived in the data center. For example, a printing event, in which a certain user computer prints a document, can be logged and archived. Typically, a log entry is created, signed and encrypted by the TOE. The TOE sends the log entry to the CMS, which forwards it via the DCC to the data center for archiving. In some embodiments, for security/privacy reasons, the encrypted log entry cannot be viewed by the CMS, but only by the data center.

Data center policies may define certain actions performed by the user computer vis-à-vis the portal as "non-repudiation" actions, i.e., actions that should be logged in such a way that the user cannot deny their occurrence. In some embodiments, when the TOE detects that a non-repudiation action has commenced, it displays an additional dialog to the user, which requires the user to re-authenticate to the system. A log entry of the re-authentication is signed and delivered to the data center for archiving, either directly or via the CMS and DCC.

In some embodiments, the data center may send non-repudiation messages, which should be logged in such a way that the user cannot deny having read them. Such messages are typically sent from the data center to the CMS, which distributes them to the relevant users. When a non-repudiation message is received by a TOE, it presents the message from a local cache. The next time a user connects to the data center, the user may be requested to acknowledge receipt of the message. The acknowledgement is signed and delivered to the data center for archiving, either directly or via the CMS and DCC.

The CMS and DCC usually participate in performing configuration management of the data center and the user computers in a secure and coordinated manner. For example, consider a scenario in which the data center changes its network configuration, e.g., changes some or all of its IP addresses. In some embodiments, the TOEs are notified of changes in the data center IP addresses via the DCC and CMS, since the TOE does not use the conventional, non-trusted, DNS methods. When the DCC detects (or is notified of) a change in the data center IP addresses, it notifies the CMS, which in turn distributes the updated IP addresses to the TOEs.

Different update mechanisms can be used between the CMS and TOEs. Some mechanisms may be "push" mechanisms in which the CMS actively distributes the information. Other mechanisms can be "pull" mechanisms in which the TOE requests updates from the CMS. In some embodiments, the TOE verifies the data center configuration with the CMS before initiating a connection with the data center. Alternatively, the TOE can verify the data center configuration only if it did not receive an update for a predetermined period of time, and not necessarily before each session.

Note that changes in the configuration of the data center should also be propagated to user computers that do not operate using the methods and systems described herein, i.e., are not fitted with TOEs and do not interact with the CMS. In some cases, a certain data center may interact with both types of user computers simultaneously.

Local configuration changes in the user computer can also be coordinated with the data center using the CMS and DCC.

For example, when the TOE senses that its local IP address has changed, it notifies the CMS, which in turn propagates the update to the data center via the DCC. In some cases, when the user computer belongs to a network that uses Network Address Translation (NAT), the external IP addresses may change without a corresponding change in the internal IP addresses. In this scenario, the CMS may not be able to initiate communication with the TOE as it may not be aware of the new addresses. Such scenarios may be resolved by the TOE initiating communication with the CMS if the two have not communicated for a predetermined period of time. Alternatively, the CMS may sense the change in external IP addresses of the TOE, and may report these changes to the user computer.

Switching from GPOE to TOE

In a typical scenario, the user communicates, surfs the Web and otherwise operates computer 28 from within the General-Purpose Operating Environment (GPOE). When the user initiates a connection with data center 24, the user computer is expected to switch (either manually or automatically) to the Trusted Operating Environment (TOE), so that a secure connection that is controlled by the CMS can be established. The description that follows presents an exemplary method for automatically switching from the GPOE to the TOE. In alternative embodiments, switching between the operating environments may be performed manually by the user.

The method assumes that the user computer runs a packet filtering process, which inspects outgoing packets and checks them against predefined rules. The packet filtering process may be part of virtualization layer 48 or of a separate operating environment. In some embodiments, the packet filtering process is embodied in a firewall application running in the user computer. The packet filtering process is configured with rules that identify some packets as related to secure connections, such as based on the packet IP addresses. In particular, the rules may identify packets that initiate such secure connections.

It is also assumed that the DCC updates the CMS with changes in its setup and policies, and that the CMS distributes its policies regarding specific sites (e.g., data center 24) to the TOEs of the different user computers. In particular, the CMS distributes domain names, IP addresses and/or service types (protocols and ports) of these sites. The CMS usually updates the policies from time to time, and propagates the updates to the TOEs. The TOE informs the packet filtering process, or the virtualization layer in general, of these policy updates, so that these updates can be reflected in the rules. The role of the packet filtering process will be explained in detail below.

FIG. 4 is a flow chart that schematically illustrates an exemplary method for selectively switching from GPOE 40 to TOE 44, in accordance with an embodiment of the present invention. The method begins with the user initiating a connection with a certain site from within the GPOE, at a connection initiation step 160. The user may initiate the connection, for example, by typing a Uniform Resource Locator (URL) in the GPOE browser, by using a shortcut of the GPOE operating system, by selecting an entry from a "favorites" menu or by clicking a hyperlink in a certain web page.

It is usually possible to distinguish between initiations of secure and non-secure connections using the connection initiation performed by the user. For example, in many cases the home page from which the extranet application is invoked is a non-secure page, such as the home page of a bank or other organization. The non-secure home page has a "login" or "access my account" button or link, using which the user initiates the secure connection. Clicking this button or link usually causes redirection to a different, secure URL (e.g., redirection from www.bankname.com to www.secure.bankname.com). Thus, a distinction can be made between secure and non-secure connection initiations based on the different URLs.

The packet filtering process running on the user computer intercepts the connection initiation, at an interception step 162. The packet filtering process may intercept an outgoing DNS packet or a packet whose service type (port/protocol) matches a known IP address. The packet filtering process checks the intercepted packet against the pre-configured rules, at a rule checking step 166.

If the rules specify that the packet is to be dropped, the packet filtering process discards the packet, at a discarding step 170. If the rules specify that the packet is to be allowed, the packet filtering process allows the packet to pass, at a sending step 174. If, on the other hand, the rules specify that the packet is related to a secure connection, the packet filtering process (or, generally, the virtualization layer) forwards the packet to the TOE, at a TOE forwarding step 178.

The TOE inspects the packet and checks whether the packet initiates a secure connection, at a secure connection checking step 182. If the packet does not initiate a secure connection (e.g., initiates a non-secure connection), the packet is sent without switching to the TOE, at sending step 174.

If the TOE concludes that the packet initiates a secure connection, the virtualization layer performs two tasks: (1) terminates the initiation within the GPOE and (2) initiates secure connection establishment from within the TOE.

In some embodiments, the virtualization layer terminates the non-secure connection initiation in the GPOE by sending an imitated reply packet to the GPOE browser, at an imitated response step 186. (In some embodiments, the virtualization layer is responsible for routing packets to the appropriate operating environment but does not generate packets. Thus, the TOE may produce the imitated reply packet and forward it to the virtualization layer. The virtualization layer forwards the imitated reply to the GPOE in order to terminate the connection initiation.)

If, for example, the initiation packet comprises a DNS request, the imitated response comprises a DNS response that leads to the requested non-secure site. In other cases, the initiation packet may comprise a packet of a certain service, such as Hyper Text Transfer Protocol over SSL (HTTPS). This scenario may occur, for example, when the user enters the desired IP address directly rather than the desired domain name. In this case, the imitated response may comprise code, such as Hyper Text Mark-Up Language (HTML) code, which closes the GPOE browser window, displays a suitable message in the GPOE browser window or redirects the GPOE browser to the non-secure home page.

The virtualization layer then switches from the GPOE to the TOE, at a switching step 190. The user computer establishes a secure connection with the data center, such as using the method of FIG. 3 above.

The principles of the present invention can be used in a wide variety of extranet applications. For example, the methods and systems described herein can be used to implement secure viewing or downloading of media, such as video, music or other content. The policies maintained by the CMS and/or DCC can ensure that the viewed media was paid for, otherwise the data center refuses or terminates the connection.

In some applications, information supplied by the CMS can be used as attestation as to the occurrence of a session, the identity of the user computer performing the session and/or the content or other information regarding the session. This information has a high level of trust, since it is measured and provided by a trusted external entity (the CMS) and not by the user computer, which may be corrupted. For example, the methods and systems described herein can be used for providing attestation in various healthcare applications that involve medical records, whose privacy is protected by regulations.

Information provided by the CMS can be used as non-repudiation information, undeniably proving that a certain session was conducted at a particular time by a particular user computer, and that the TOE of this user computer was trustworthy at the time with high likelihood.

Additionally or alternatively, the CMS monitoring results can be used for authenticating users, user computers, connections and sessions, as well as performing other Authentication, Authorization, and Accounting (AAA) functions. The CMS may provide various identity management functions, such as user enrollment (provisioning), user maintenance (e.g., adding and deletion of users, password changes, recovery of lost credentials) and revocation. User provisioning can apply to individual users, groups of users, user computers and groups of user computers, organizations and groups of organizations.

The CMS can be viewed as providing the TOEs with Trusted Network Information (TNI), so that the TOEs are able to communicate with the data center via a secure connection, without relying on non-trusted network information. Such TNI may comprise domain name resolution, routing information (possibly taking into account performance, cost and/or other criteria), as well as security-related information, such as certificates.

In some embodiments, the CMS provides a self-service portal for the organizations operating the data centers, using which the organizations can configure the services and features of the TOEs. The CMS is also able to configure the local TOE firewalls to allow traffic to and from specific IP addresses. Further additionally, the CMS may sometimes provide a different TOE image to a certain user computer before each session or even during the session, or otherwise manage the operating environment images of the different TOEs.

In some implementations, the TOE may host "fat" client applications, such as Java and NET applications. Such applications often operate using a Java Virtual Machine (JVM). In some embodiments, the CMS monitors and controls such fat client applications.

In addition to the TOE functionality described above, in some embodiments the TOE may comprise additional functions. For example, in some embodiments the TOE may have no residual code. In these embodiments, a partial image is downloaded to the TOE from the CMS before each session. Using this technique, a certain user computer can be assigned a different TOE image for each session. The TOE code may be dynamic, i.e., code which changes at runtime. The TOE may feature local single sign-on, i.e., a single identity that applies to different services. The local storage performed by the TOE may be encrypted. The TOE may employ or support different means for authenticating the user, such as username/password entry, smartcard support, and support of various biometric authentication devices, voice recognition and keyboard typing recognition.

Although the embodiments described herein mainly address extranet applications in which communication is transported over public networks, the principles of the present invention can also be used for enhancing the security of intranet applications in which communication is confined to a private network.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A system for communication with a server, the system comprising:
   a user computer configured to run a first operating environment for performing general-purpose operations, and a second operating environment configured expressly for interacting with the server in a protected communication session and is isolated from the first operating environment, where in the protected communication session the second operating environment exchanges transaction data with the server via a security protocol, where the general-purpose operations performed in the first operating environment do not affect operation of the second operating environment, and where the first operating environment does not interact with the server in the protected communication session; and
   a central management subsystem coupled to the server and the user computer and external to the server and to the user computer, configured to assess a trustworthiness of the second operating environment running on the user computer including to monitor a performance of software components of the second operating environment during the protected communication session to determine if the monitored performance matches an expected performance of code for the second operating environment, the central management subsystem further to report the assessed trustworthiness to the server to cause the server to control the communication session between the server and the user computer based on the assessed trustworthiness,
   wherein the central management subsystem is further coupled to one or more additional servers and one or more additional user computers, each user computer configured to run respective first and second operating environments to interact in respective communication sessions with one or more of the additional servers using the second operating environments and to perform general-purpose operations using the first operating environments,
   wherein the second operating environments are isolated from the respective first operating environments, and the central management subsystem external to the servers and the user computers, the central management subsystem further configured to assess the trustworthiness of respective second operating environments running on the additional user computers including to monitor a performance of software components of the second operating environments during the protected communication sessions to determine if the monitored performance matches an expected performance of code for the second operating environments, the central management subsystem further to report the assessed trustworthiness to the servers to cause the server to control the communication sessions between the servers and the user computers based on the assessed trustworthiness.

2. The system according to claim 1, and comprising a connector unit, which is connected to the server and is arranged to communicate with the central management subsystem, wherein the central management subsystem is coupled to report the assessed trustworthiness to the connector unit.

3. The system according to claim 2, wherein the central management subsystem is coupled to compute a trust rank quantifying the trustworthiness of the second operating environment and to send the trust rank to the connector unit, and wherein the connector unit is arranged to apply a policy applicable to the communication session responsively to the trust rank.

4. The system according to claim 3, wherein the central management subsystem is coupled to receive the policy from the server via the connector unit.

5. The system according to claim 2, wherein the central management subsystem is coupled to compute a trust rank quantifying the trustworthiness of the second operating environment and to apply a policy applicable to the communication session responsively to the trust rank.

6. The system according to claim 1, wherein the central management subsystem is coupled to report the assessed trustworthiness to the server by sending the assessed trustworthiness to the user computer, and wherein the user computer is coupled to send the assessed trustworthiness to the server.

7. The system according to claim 1, wherein the central management subsystem is coupled to assess the trustworthiness by detecting variations in the operation of the second operating environment.

8. The system according to claim 1, wherein the central management subsystem is coupled to provide Trusted Network Information (TNI) to the user computer for conducting the communication session, and wherein the user computer is coupled to receive the TNI from the central management subsystem and to conduct the communication session using the received TNI.

9. The system according to claim 8, wherein the TNI comprises at least one information type selected from a group of types consisting of an Internet Protocol (IP) address, routing information, domain resolution information and a security certificate.

10. The system according to claim 1, wherein the user computer is coupled to notify the central management subsystem before initiation of the communication session with the server, and wherein the central management subsystem is coupled to notify the server of the session initiation and of communication attributes to be used by the user computer in the session initiation, so as to cause the server to allow the session initiation based on the notified communication attributes.

11. The system according to claim 10, and comprising a connector unit, which is connected to the server and is arranged to communicate with the central management subsystem so as to receive the communication attributes of the session initiation, and a packet filter, which is attached to the server and is arranged to accept the communication attributes from the connector unit and to allow the session initiation having the communication attributes.

12. The system according to claim 10, wherein the communication attributes comprise at least one attribute selected from a group of attributes consisting of an IP address, a port number and a security certificate to be used by the user computer in the session initiation.

13. The system according to claim 1, wherein the user computer comprises a virtualization unit, which is arranged to allocate resources of the user computer to the first and second operating environments.

14. The system according to claim 1, wherein the user computer is coupled to enforce a policy of the server using the second operating environment.

15. The system according to claim 14, wherein, in accordance with the policy, the user computer is coupled to selectively process information provided by the server from within the second operating environment.

16. The system according to claim 15, wherein the information provided by the server comprises documents.

17. The system according to claim 14, wherein, in accordance with the policy, the user computer is coupled to log an event related to the second operating environment and to forward the logged event to the server.

18. The system according to claim 14, wherein, in accordance with the policy, the user computer is coupled, upon identifying that an action performed by a user of the user computer is predefined as a non-repudiation action, to cause the user to perform re-authentication and to forward a log of the re-authentication to the server.

19. The system according to claim 1, wherein the central management subsystem is coupled to receive a notification from the server upon a change in communication settings of the server, and to update the user computer with the change.

20. The system according to claim 1, wherein the central management subsystem is coupled to receive a notification from the user computer upon a change in communication settings of the user computer, and to update the server with the change.

21. The system according to claim 1, wherein the user computer is coupled to identify a data packet indicating that a user of the user computer requests to initiate the communication session with the server from within the first operating environment, and to switch to initiating the communication session from within the second operating environment.

22. The system according to claim 21, wherein the user computer runs a packet filtering process, which is arranged to process the data packet in accordance with a rule, and to forward the data packet to the second operating environment when the rule identifies that the data packet is related to communication with the server.

23. The system according to claim 21, wherein the user computer is coupled to terminate initiation of the communication session in the first operating environment by sending an imitated reply packet to the first operating environment in response to the data packet.

24. The system according to claim 1, wherein the central management subsystem is coupled to store an image code of the second operating environment, and wherein the user computer is coupled to download the image from the central management subsystem during the communication session.

25. The system according to claim 1, wherein the central management subsystem comprises a configuration interface for configuring the second operating environment of the user computer.

26. The system according to claim 1, wherein the central management subsystem is coupled to produce attestation information regarding the second operating environment based on the assessed trustworthiness of the second operating environment, and to provide the attestation information to the server.

27. The system according to claim 1, wherein the central management subsystem is coupled to produce authentication information regarding the user computer based on the assessed trustworthiness of the second operating environment, and to provide the authentication information to the server.

28. The system according to claim 1, wherein the central management subsystem is coupled to produce authentication information regarding a user of the user computer based on the assessed trustworthiness of the second operating environment, and to provide the authentication information to the server.

29. The system according to claim 1, wherein the central management subsystem is coupled to assess the trustworthiness of information conveyed in the communication session and to report the assessed trustworthiness of the information to the server.

30. A user computer, comprising:
a first operating environment for performing general-purpose operations; and
a second operating environment configured expressly for interacting with a server in a protected communication session and is isolated from the first operating environment, where in the protected communication session the second operating environment exchanges transaction data with the server via a security protocol, where the general-purpose operations performed in the first operating environment do not affect operation of the second operating environment, and where the first operating environment does not interact with the server in the protected communication session,
the second operating environment further coupled to provide information to a central management subsystem external to the user computer to enable the central management subsystem to assess a trustworthiness of the second operating environment including to monitor a performance of software components of the second operating environment during the protected communication session to determine if the monitored performance matches an expected performance of code for the second operating environment, the central management subsystem further to report the assessed trustworthiness to the server to cause the server to control the communication session between the server and the user computer based on the assessed trustworthiness,
wherein the central management subsystem is further coupled to one or more additional servers and one or more additional user computers, each user computer configured to run respective first and second operating environments to interact in respective communication sessions with one or more of the additional servers using the second operating environments and to perform general-purpose operations using the first operating environments,
wherein the second operating environments are isolated from the respective first operating environments, and the central management subsystem external to the servers and the user computers, the central management subsystem further configured to assess the trustworthiness of respective second operating environments running on the additional user computers including to monitor a performance of software components of the second operating environments during the protected communication sessions to determine if the monitored performance matches an expected performance of code for the second operating environments, the central management subsystem further to report the assessed trustworthiness to the servers to cause the server to control the communication sessions between the servers and the user computers based on the assessed trustworthiness.

31. A computer software product for use in a user computer, the product comprising a non-transitory computer-readable storage medium, in which program instructions are stored, which instructions, when executed by the user computer, cause the user computer
to run a first operating environment for performing general-purpose operations,
to run a second operating environment configured expressly for interacting with a server in a protected communication session and is isolated from the first operating environment, where in the protected communication session the second operating environment exchanges transaction data with the server via a security protocol, where the general-purpose operations performed in the first operating environment do not affect operation of the second operating environment, and where the first operating environment does not interact with the server in the protected communication session, and
to provide information by the second operating environment to a central management subsystem external to the user computer to enable the central management subsystem to assess a trustworthiness of the second operating environment including to monitor a performance of software components of the second operating environment during the protected communication session
to determine if the monitored performance matches an expected performance of code for the second operating environment, and
to control the communication session between the server and the user computer based on the assessed trustworthiness,
wherein the central management subsystem is further coupled to one or more additional servers and one or more additional user computers, each user computer configured to run respective first and second operating environments to interact in respective communication sessions with one or more of the additional servers using the second operating environments and to perform general-purpose operations using the first operating environments,
wherein the second operating environments are isolated from the respective first operating environments, and the central management subsystem external to the servers and the user computers, the central management subsystem further configured to assess the trustworthiness of respective second operating environments running on the additional user computers including to monitor a performance of software components of the second operating environments during the protected communication sessions to determine if the monitored performance matches an expected performance of code for the second operating environments, the central management subsystem further to report the assessed trustworthiness to the servers to cause the server to control the communication sessions between the servers and the user computers based on the assessed trustworthiness.

* * * * *